(12) United States Patent
Sovio et al.

(10) Patent No.: US 8,332,624 B2
(45) Date of Patent: Dec. 11, 2012

(54) METHOD AND APPARATUS FOR ENCODING DECISION DIAGRAMS

(75) Inventors: Sampo Juhani Sovio, Riihimäki (FI); Vesa-Veikko Luukkala, Espoo (FI)

(73) Assignee: Nokia Corporation, Espoo (FI)

( * ) Notice: Subject to any disclaimer, the term of this patent is extended or adjusted under 35 U.S.C. 154(b) by 603 days.

(21) Appl. No.: 12/548,327

(22) Filed: Aug. 26, 2009

(65) Prior Publication Data

US 2011/0055545 A1    Mar. 3, 2011

(51) Int. Cl.
   *G06F 17/30*    (2006.01)
(52) U.S. Cl. ........ 713/150; 707/715; 707/747; 707/781; 706/59; 380/277
(58) Field of Classification Search ........... 713/150; 706/59; 380/277; 707/747
   See application file for complete search history.

(56) References Cited

U.S. PATENT DOCUMENTS

| | | | |
|---|---|---|---|
| 6,301,687 B1 * | 10/2001 | Jain et al. ................ | 716/107 |
| 7,146,371 B2 | 12/2006 | Hofstee et al. | |
| 7,634,657 B1 | 12/2009 | Stringham | |
| 7,636,703 B2 | 12/2009 | Taylor | |
| 7,761,466 B1 | 7/2010 | Eshghi | |
| 2003/0120932 A1 | 6/2003 | Epstein | |
| 2003/0120953 A1 | 6/2003 | Radatti | |
| 2003/0217340 A1 * | 11/2003 | Teig et al. .................. | 716/3 |
| 2005/0108283 A1 | 5/2005 | Karimisetty et al. | |
| 2005/0165690 A1 | 7/2005 | Liu et al. | |
| 2005/0276400 A1 | 12/2005 | Morrison et al. | |
| 2007/0294235 A1 * | 12/2007 | Millett ....................... | 707/3 |
| 2008/0263360 A1 | 10/2008 | Haitsma et al. | |
| 2009/0254513 A1 * | 10/2009 | Luukkala et al. ................ | 707/2 |
| 2010/0017487 A1 | 1/2010 | Patinkin | |
| 2011/0072273 A1 | 3/2011 | Wilson | |

OTHER PUBLICATIONS

Binary Decision Diagram. Wikipedia, Last Modified: Oct. 21, 2009, Accessed: Nov. 10, 2009, pp. 1-7, http://en.wikipedia.org/wiki/Binary_decision_diagram.
Office Action for related U.S. Appl. No. 12/548,333, dated May 16, 2011, pp. 1-41.

* cited by examiner

*Primary Examiner* — Kaveh Abrishamkar
(74) *Attorney, Agent, or Firm* — Ditthavong Mori & Steiner, P.C.

(57) ABSTRACT

An approach is provided for reducing decision diagram related communication traffic and cost by encoding decision diagrams. A hash identifier application constructs a reduced ordered binary decision diagram from a resource description framework graph, computes a hash identifier corresponding to the decision diagram, and stores the hash identifier with the decision diagram.

20 Claims, 14 Drawing Sheets

| ID 510 | Access control / privacy 520 | Keyed ID 530 | history 540 | graph 550 |
|---|---|---|---|---|
| hash123 | ... | <hash34,keyid1>, <hash32,keyid2> | BDD_AND(<hash31,plain>, <hash11,keyid4>) | |
| hash31 | Publishing allowed for group members | <hash11,keyid4>, <hash32,keyid2> | BDD_OR(<hash26,plain>, <hash101,plain>) | |
| hash26 | Publishing allowed for Matti | Empty | BDD_OR(<hash37,plain>, <hash12,plain>) | |
| hash101 | Publishing allowed for all | Empty | Empty history | ... |

US 8,332,624 B2

METHOD AND APPARATUS FOR ENCODING DECISION DIAGRAMS

BACKGROUND

Service providers (e.g., wireless and cellular services) and device manufacturers are continually challenged to deliver value and convenience to consumers by, for example, providing compelling network services and advancing the underlying technologies. One area of interest has been in ways to reduce data traffic on the existing networks while maintaining a level of service acceptable to users. Search queries and the results of search queries have substantially increased congestion on networks. The number of systems and platforms performing a search query using a decision diagram is increasing. Such a decision diagram is used to organize data in a search query into a tree-type data structure that permits identification of a result by traversing various branches of the structure. As users continue to increase their reliance on data retrieved from networks, the number of search queries and the results of search queries transmitted in decision diagram form increase. Consequently, service providers and device manufacturers face the challenge of providing sufficient communication and network resources to support queries based on or related to decision diagrams.

SOME EXAMPLE EMBODIMENTS

According to one embodiment, a method comprises constructing a reduced ordered binary decision diagram from a resource description framework graph. The method also comprises computing a hash identifier corresponding to the decision diagram. The method further comprises storing the hash identifier with the decision diagram.

According to another embodiment, an apparatus comprising at least one processor, and at least one memory including computer program code, the at least one memory and the computer program code configured to, with the at least one processor, cause the apparatus to construct a reduced ordered binary decision diagram from a resource description framework graph. The apparatus is also caused to compute a hash identifier corresponding to the decision diagram. The apparatus is further caused to store the hash identifier with the decision diagram.

According to another embodiment, a computer-readable storage medium carrying one or more sequences of one or more instructions which, when executed by one or more processors, cause an apparatus to construct a reduced ordered binary decision diagram from a resource description framework graph. The apparatus is also caused to compute a hash identifier corresponding to the decision diagram. The apparatus is further caused to store the hash identifier with the decision diagram.

According to another embodiment, an apparatus comprises means for constructing a reduced ordered binary decision diagram from a resource description framework graph. The apparatus also comprises means for computing a hash identifier corresponding to the decision diagram. The apparatus further comprises means for storing the hash identifier with the decision diagram.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a partial diagram of an external index table utilized in the process of FIG. 3, according to one embodiment;

DESCRIPTION OF SOME EMBODIMENTS

A method and apparatus for encoding decision diagrams are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "decision diagram" refers to a compact graphical and/or mathematical representation of a decision situation, sets, or relations. A decision diagram, for example, may be a binary decision diagram (BDD) or a reduced ordered binary decision diagram (ROBDD). A BDD is "ordered" if different variables appear in the same order on all paths from the root. A BDD is "reduced" if any isomorphic subgraphs of its graph are merged and any nodes whose two child nodes are isomorphic are eliminated. Isomorphic subgraphs of the same decision diagram have similar appearance but originated from different sources. A ROBDD is a group of Boolean variables in a specific order and a directed acyclic graph over the variables. A directed acyclic graph (DAG) contains no cycles. This means that if there is a route from node A to node B then there is no way back. Although the term BDD almost always refers to reduced ordered binary decision diagram (ROBDD), this application refers to ROBDD separately from BDD to avoid confusion.

A decision diagram may be used to organize any data, including search queries, into a tree-type data structure that permits identification of a result by traversing various branches of the structure. Although various embodiments are described with respect to search queries, it is contemplated that the approach described herein may be used with other data that can be organized into a tree-type data structure. The term "AugBDD" refers to an augmented ROBDD which is augmented information including the ROBDD and at least one of a header with a hash ID, a construction history of the ROBDD, and cardinality information (e.g., relationships between data tables, constraints on the types and number of class instances a property may connect with respect to a given ontology, etc.).

As used herein, the term "construction history information" of a hash identifier of interest includes at least one or more other hash identifiers corresponding to a respective one or more other decision diagrams used to construct a decision diagram corresponding to the hash identifier of interest. The construction history also includes identification of one or more Boolean operators applied to the other hash identifiers listed in history.

Figure 1:
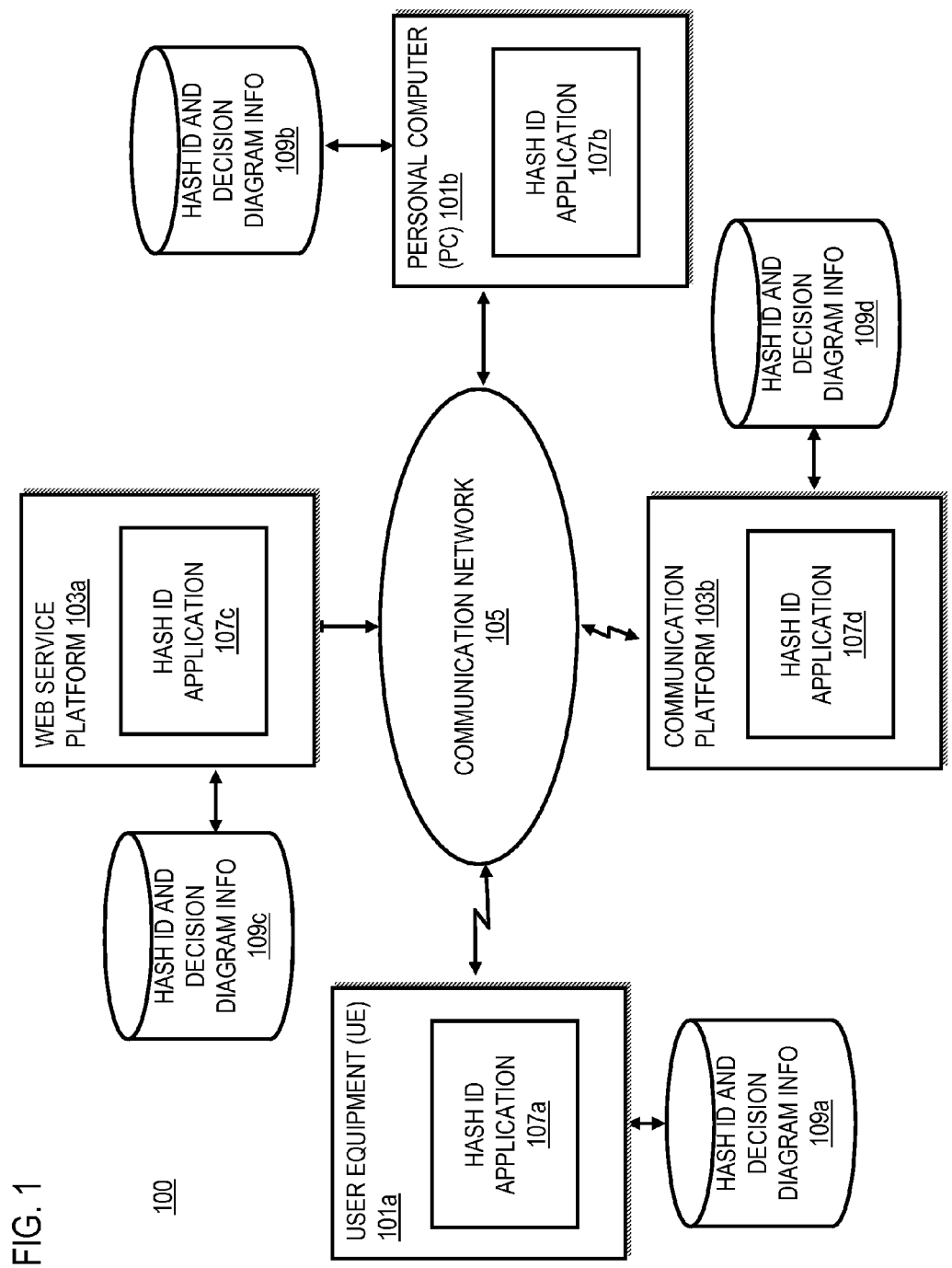
FIG. 1 is a diagram of a system capable of encoding decision diagrams, according to one embodiment.

FIG. 1 is a diagram of a system capable of encoding decision diagrams, according to one embodiment. As discussed above, the use of decision diagrams for organizing data in search queries is growing. However, this growth can also potentially increase demand on network resources for transmitting the queries and corresponding search results within the network. The system 100 of FIG. 1 addresses this problem by transmitting a hash identifier representing a decision diagram rather than the decision diagram itself, thereby reducing network traffic. More specifically, the system 100 provides for hash tables listing known or existing decisions diagrams along with their corresponding respective hash identifier and other related information. An entity performing a query comprising one or more hash identifiers or receiving query results including one or more hash identifiers may then consult one of the hash tables to obtain the corresponding decision diagrams.

One significant consideration is the encoding scheme used to generate a hash identifier for a decision diagram. There are some traditional encoding schemes that can result in hash identifiers that are actually larger in size than the unencoded decision diagram itself. The system 100 addresses this problem by using either a parameterized or heuristic approach for determining a maximum size for a hash identifier while maintaining uniqueness of the hash identifier such that any two decision diagrams will not have identical hash identifiers. For example, upon receiving a search query, the system 100 serializes the decision diagram into variables and then feeds the variables into a hash function thereby obtaining unique hash identifiers corresponding to the decision diagram. In addition, the system truncates the hash identifiers to a specific bit size while maintaining their uniqueness, thereby saving communication resources while transmitting the same information.

By way of example, the system 100 is applied to freely formed resource description framework (RDF)-graphs or RDF-graphs generated by ontology based information sharing systems over the semantic web. In one embodiment, RDF graphs represent decision diagrams and describe resources with classes, properties, and values. Sets of properties are defined within RDF Vocabularies (or Schemas). A node/resource is any object which can be pointed to by a uniform resource identifier (URI), properties are attributes of the node, and values can be either atomic values for the attribute, or other nodes. RDF Schema provides a framework to describe application-specific classes and properties. Classes in RDF Schema are like classes in object oriented programming languages. This allows resources to be defined as instances of classes, and subclasses of classes. The RDF graphs are represented or encoded in decision diagrams which describe the properties and relations of different classes. For example, information about a particular web page (a node), includes the property "Author". The value for the Author property could be either a string giving the name of the author, or a link to a resource describing the author. One typical example of an rdfs:Class is foaf:Person in the Friend of a Friend (FOAF) vocabulary. An instance of foaf:Person is a resource linked to the class using an rdf:type predicate, such as in the following formal expression "John rdf:type foaf:Person" of the natural language sentence.

Ontology has notions of a property/attribute, which has a range and a domain (both of which define classes). A class has a name and potentially several associated properties, and it may be a subclass of another class. A class can be instantiated to a graph so that it is represented by a node in the graph. Possible properties are represented as arcs from one class node to other class nodes. These property-arcs can be properties of the object which have values (that are the nodes targeted by the property arcs). For instance, in person ontology, a Person class has a name property and an ID property, which places a restriction on the domains of both properties: e.g., define both properties as a Person class. Constraints may be added on the range of properties. For example, the range of ID is a number (a data value) and the range of name is another class, such as FullName. A class instance typically also has an arc that connects it to its class type.

A query can be performed against the originally received query result decision diagram, using criteria included in the query instruction, to generate a second query result decision diagram. In this regard, the second query result decision diagram can be a subset of the originally received query result decision diagram. To generate the second query result decision diagram, various logical operations, such as the logical-and operation, can be utilized. The query result data associated with this subsequent query may be decoded using the same dictionary that was used to decode the originally received query result decision diagram. The query result data can also be output to a user. Further, subsequent queries may also be performed, that further narrow the results, in the same manner.

Each RDF-graph includes a set of unique triples in a form of subject, predicate, and object, which allow expressing graphs. For example, in this piece of information "Jenna is Matti's friend," the subject may be Jenna, the predicate may be friend, and the object may be Matti. The simplest RDF-graph is a single triple. Any node or entity can store unconnected graphs. As later explained in more detail, the approach described herein can be adapted in a smart space that includes the semantic web and has distributed nodes and entities that communicate RDF-graphs (e.g., via a blackboard or a shared memory).

The smart space is interoperable over different information domains, different service platforms, and different devices and equipment. For example, the smart space accommodates transmission control protocol/Internet protocol (TCP/IP), Unified Protocol (UniPro) created by the Mobile Industry Processor Interface (MIPI) Alliance, Bluetooth protocol Radio Frequency Communication (RFCOMM), IPv6 over Low power Wireless Personal Area Networks (6LoWPAN), etc. The smart space also covers technologies used for discovering and using services, such as Bluetooth/human interface device (HID) services, web services, services certified by the Digital Living Network Alliance (DLNA), the Network on Terminal Architecture (NoTA). In addition, the smart space constitutes an infrastructure that enables scalable producer-consumer transactions for information, and supports multiparts, multidevices and multivendors (M3), via a common representation of a set of concepts within a domain and the relationships between those concepts, i.e. ontologies. The smart space as a logical architecture has no dependencies on any network architecture but it can be implemented on top of practically any connectivity solution. Since there is no specific service level architecture, the smart space has no limitation in physical distance or transport.

The smart space allows cross domain searches and provides a uniform, use case independent service application programming interface (API) for sharing information. As an example, the smart space allows a mobile platform to access contextual information in, e.g., a car, home, office, football stadium, etc., in a uniform way and to improve the user experience, without compromising real-time requirements of the embedded system. The smart space uses an ontology governance process as the alternative to using case-specific service API standardization. The ontology governance process agrees and adopts new vocabularies using Resource Description framework (RDF) and RDFS (RDF schema). When RDFS is not sufficient for defining and instantiating the ontologies, web ontology language (OWL) or the like is used.

In one embodiment, the RDF is used to join data from vocabularies of different domains (such as business domains), without having to negotiate structural differences between the vocabularies. In addition, the RDF allows the smart space to merge the information of the embedded domains with the information in web, as well as to make the vast reasoning and ontology theory, practice and tools developed by the semantic web community available for developing smart space applications. The smart space is an aggregation of individual smart spaces of private, group or public entities and the smart space makes the heterogeneous information in embedded domains available for semantic web tools. The smart space architecture expands the concept of a deductive closure towards a distributed deductive closure. The smart space architecture addresses values in application development by abolishing the need for a prior use case standardization such as those in the Digital Living Network Alliance (DLNA) domain and the Bluetooth domain. Furthermore, the smart space architecture abolishes design time freezing of the address of any used service API, such as in the case of WebServices.

The smart space architecture is different from university-driven RDF-store based approaches in getting information of embedded systems as an integral part of the search extent. The space-based approach of the smart space architecture also provides an alternative to surrendering personal data to a search engine or a service provider. The smart space architecture applies to the semantic web an end-to-end design principle which is widely applied in the Internet, since communication media can never know the needs of endpoints as well as the endpoints themselves.

The smart space architecture allows a user's devices purchased at different times and from different vendors to work together. For example, the user can listen/watch/etc. to music/movies/etc. and have the sound output directed to a set of high quality speakers and/or display whenever the user is using a personal device in the vicinity of the high quality speakers/display. The smart space architecture allows application developers to mash-up services in different domains, instead of trying to port one application to all platforms and configurations. The smart space architecture allows device manufacturers to make interoperable products, so that consumers have no concerns about compatibility of different products and accessories.

Each individual smart space within the smart space architecture can be constructed by physically distributed information stores. For example, the personal information of a family is stored at home linked with one information store, while it is augmented with non-personal information at a website (e.g., a social networking website) linked with the same or a different information store. In this example, the website operator prefers augmenting rather than merging the information due to, for instance, copyright and/or privacy concerns.

One of the problems of sharing information in the semantic web is to share the graphs or parts of the graphs (i.e., subgraphs) among distributed nodes and entities via information stores with sufficient identification of the graphs (especially the subgraphs) while minimizing communication traffic.

To address this problem, a system 100 of FIG. 1 introduces the capability to encode decision diagrams. The RDF graphs can be encoded to decision diagrams to be communicated between the nodes and entities. To further reduce communication traffic, the system 100 encodes (e.g., hashes) the decision diagrams into hash IDs, and avoids sending decision diagrams by sending the hash IDs and optionally a construction history of the decision diagrams. By way of example, a reduced ordered binary decision diagram (ROBDD) is used as an efficient representation for a binary decision diagram representing an information set and hashed with a hash function into a hash identifier (hash ID). ROBDD is essentially a group of Boolean variables in a specific order and a directed acyclic graph over the variables. A depth-first search of the ROBDD yields all possible values of the information set described by the ROBDD.

Each ROBDD is constructed from a binary decision diagram (representing a set of bits and their relationship) by means of reduction rules. The basic logical operations: and, or, not, equivalence, existential and universal abstractions are defined for ROBDDs as reduction rules. In other words, the system 100 constructs a new ROBDD by means of logical operations over a BDD. The constructed ROBDD is canonical for the set of bits it represents and for the order of its variables. The order of variables affects the size of the constructed ROBDD.

From a constructed ROBDD, the system 100 obtains a possible solution to the logical formula the ROBDD represents by traversing the ROBDD. This can be done in polynomial time (i.e., the running time is upper bounded by a polynomial in the size of the input for the algorithm). The problem of finding the best variable ordering is NP-hard (NP stands for Nondeterministic Polynomial time), i.e., inherently difficult to provide algorithms that are efficient for both general and specific computations. Since the problem of finding a satisfying assignment to variables in a logical formula is known to be NP complete (the class of NP-complete problems contains the most "difficult" problems in NP), the construction of the ROBDD is difficult. However, in practice ROBDDs have proved to be a very efficient way of encoding and operating on large sets, although it may be challenging to find a satisfying assignment of variables in a logical formula to construct a ROBDD.

As shown in FIG. 1, the system 100 comprises a user equipment (UE) 101a having connectivity to a personal computer 101b, a web service platform 103a and a communication platform 103b via a communication network 105. Each of the UE 101a, the personal computer 101b, the web service platform 103a and the communication platform 103b has a hash identifier application 107 and a database 109 for storing hash identifier and decision diagram information. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101a is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101a can support any type of interface to the user (such as "wearable" circuitry, etc.).

By way of example, the UE 101a, the personal computer 101b, the web service platform 103a and the communication platform 103b communicate with each other and other components of the communication network 105 using well known, new or still developing protocols, such as Smart Space Access Protocol (SSAP). In this context, a protocol includes a set of rules defining how the network nodes within the communication network 105 interact with each other based on information sent over the communication links The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
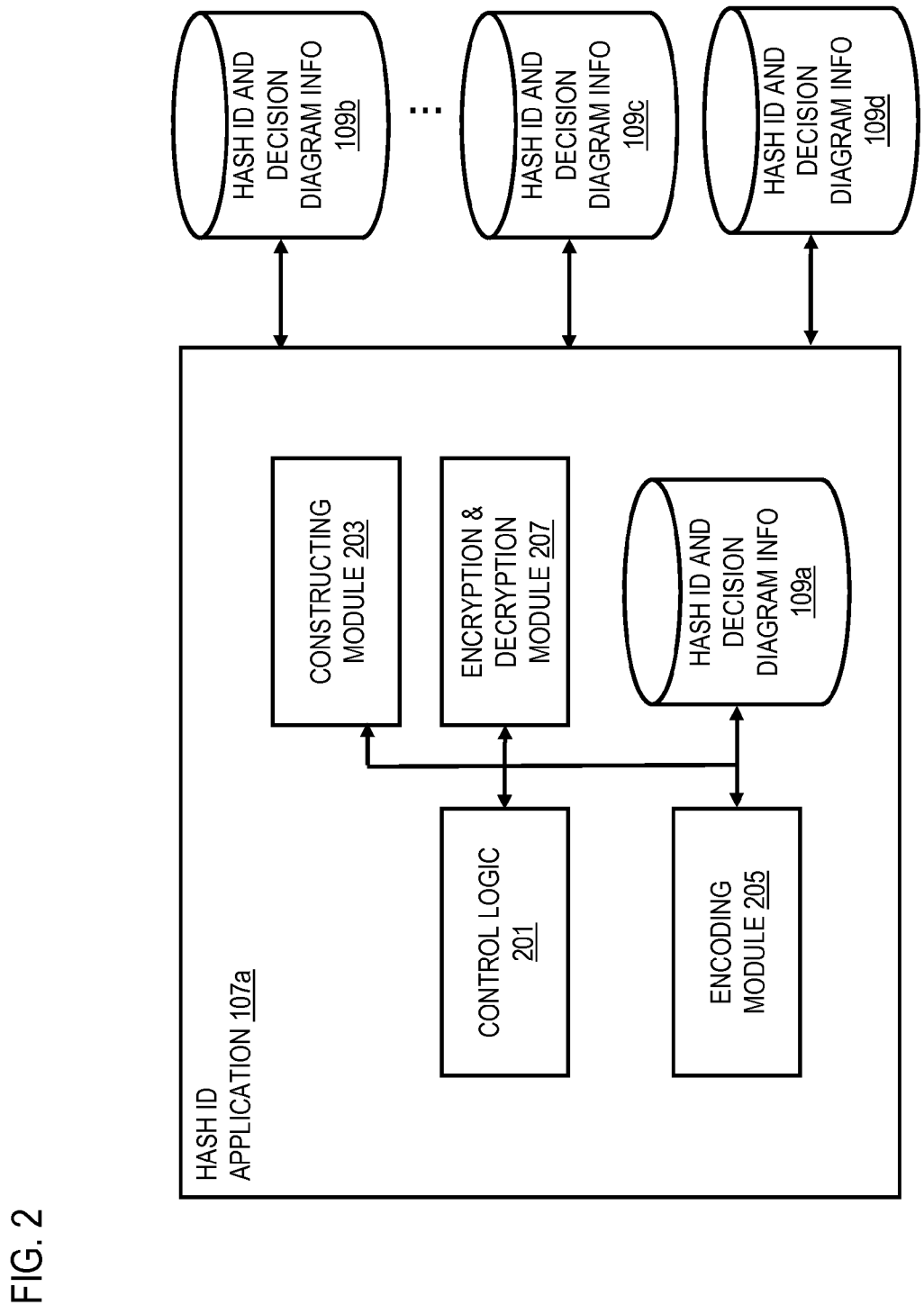
FIG. 2 is a diagram of the components of a hash identifier ("hash ID") application, according to one embodiment.

FIG. 2 is a diagram of the components of the hash identifier application 107a, according to one embodiment. By way of example, the hash identifier application (e.g., a widget) 107a includes one or more components for encoding decision diagrams. Widgets are light-weight applications, and provide a convenient means for presenting information and accessing services. It is contemplated that the functions of these components may be combined in one or more components or performed by other components of equivalent functionality. It is contemplated that the functions of these components may be combined in one or more components or performed by other components of equivalent functionality. In this embodiment, the hash identifier application 107a includes a control logic 201 for controlling the operation of the hash identifier application; a constructing module 203 for constructing a decision diagram from a RDF graph; an encoding module 205 for computing a hash identifier corresponding to the decision diagram and recalculating the hash identifier, when the RDF graph changes; an encryption/decryption module 207 for encrypting the hash identifier into a keyed hash identifier and decrypting a keyed hash identifier; and the hash identifier and decision diagram database 109a. The hash identifier applications 107b, 107c, 107d have the same or similar features of the hash identifier application 107a.

Figure 3:
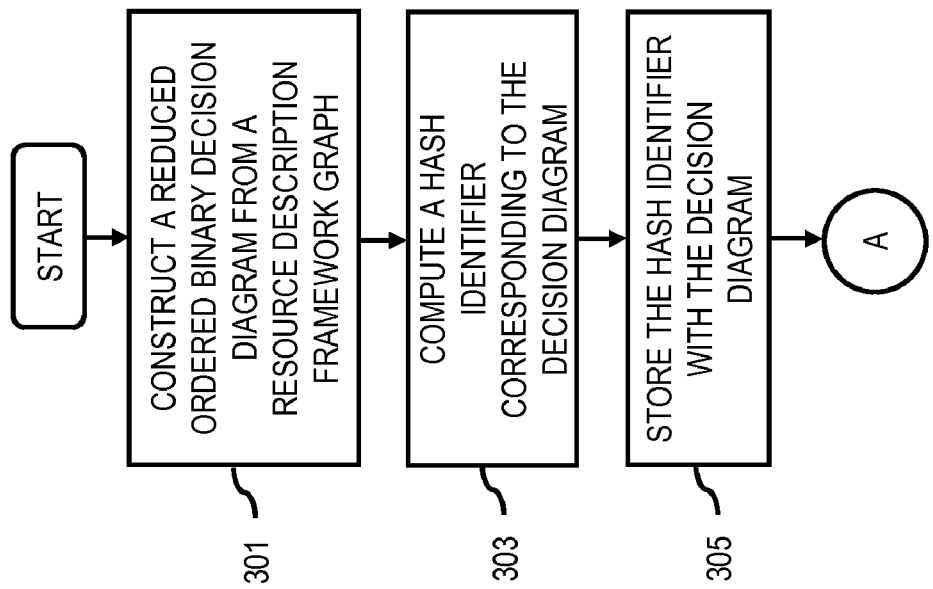
FIG. 3 is a flowchart of a process for encoding decision diagrams, according to one embodiment.
Figure 12:
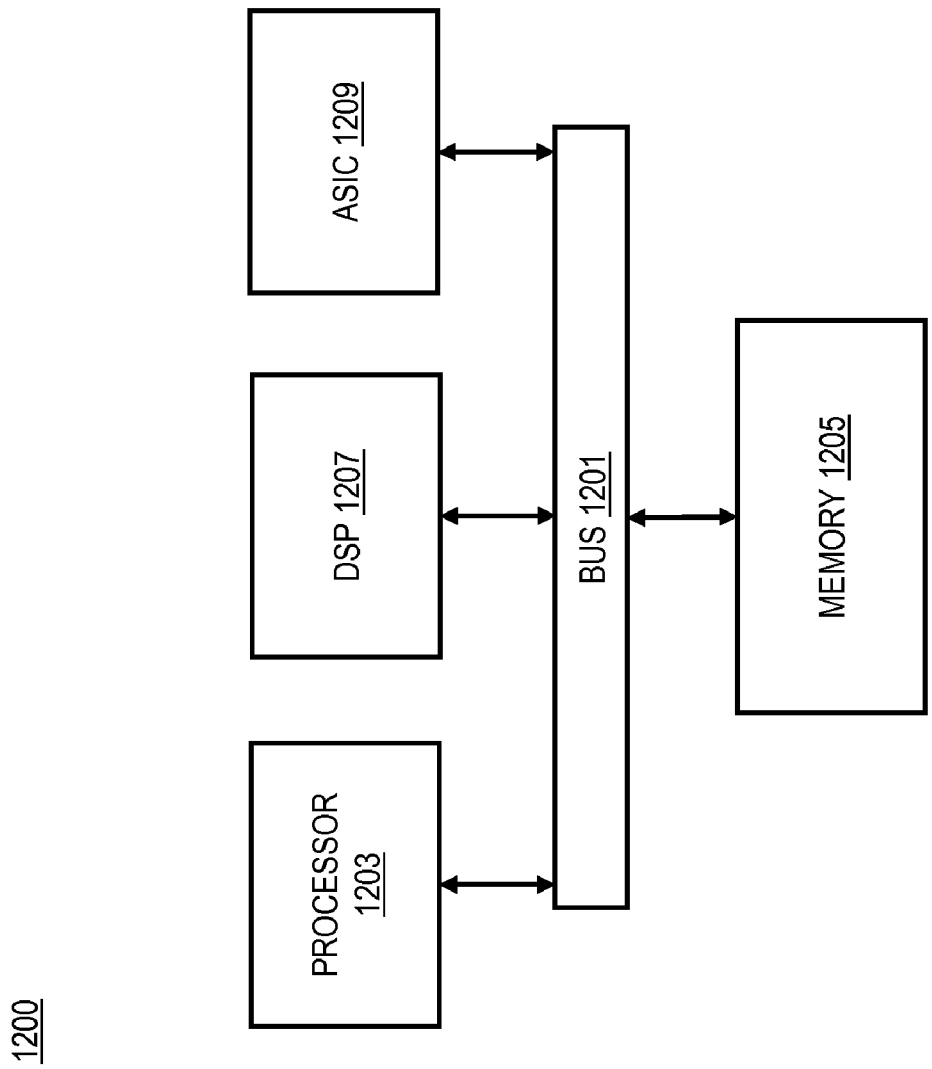
FIG. 12 is a diagram of a chip set that can be used to implement an embodiment of the invention.

FIG. 3 is a flowchart of a process for encoding decision diagrams, according to one embodiment. In one embodiment, the hash identifier application 107a performs the process 300 and is implemented in, for instance, a chip set including a processor and a memory as shown in FIG. 12. In step 301, the hash identifier application 107a constructs a ROBDD from a RDF graph. Thereafter, the hash identifier application 107a computes a hash identifier corresponding to the decision diagram (Step 303), and stores the hash identifier with the decision diagram (Step 305).

Figure 4B:
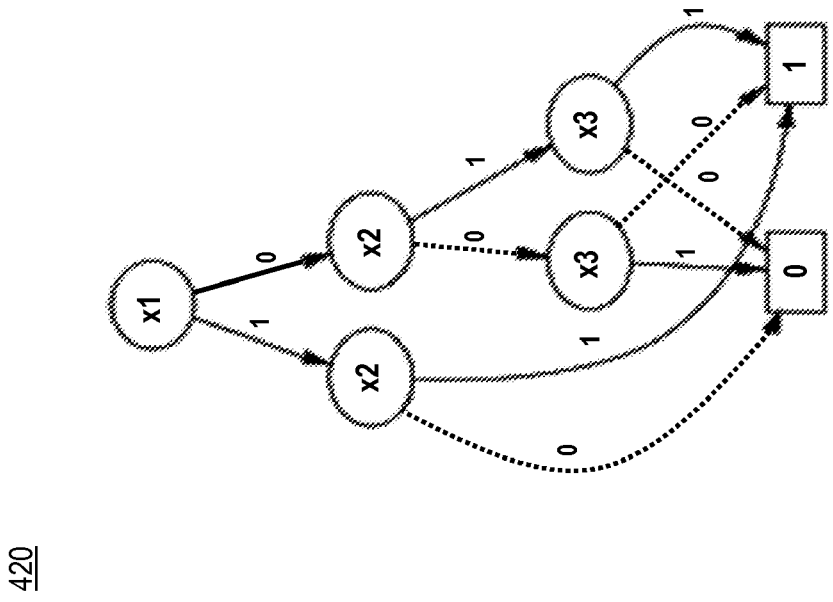
FIGS. 4A-4B are diagrams of a binary decision diagram and a corresponding reduced ordered binary decision diagram, according to one embodiment.
Figure 4A:
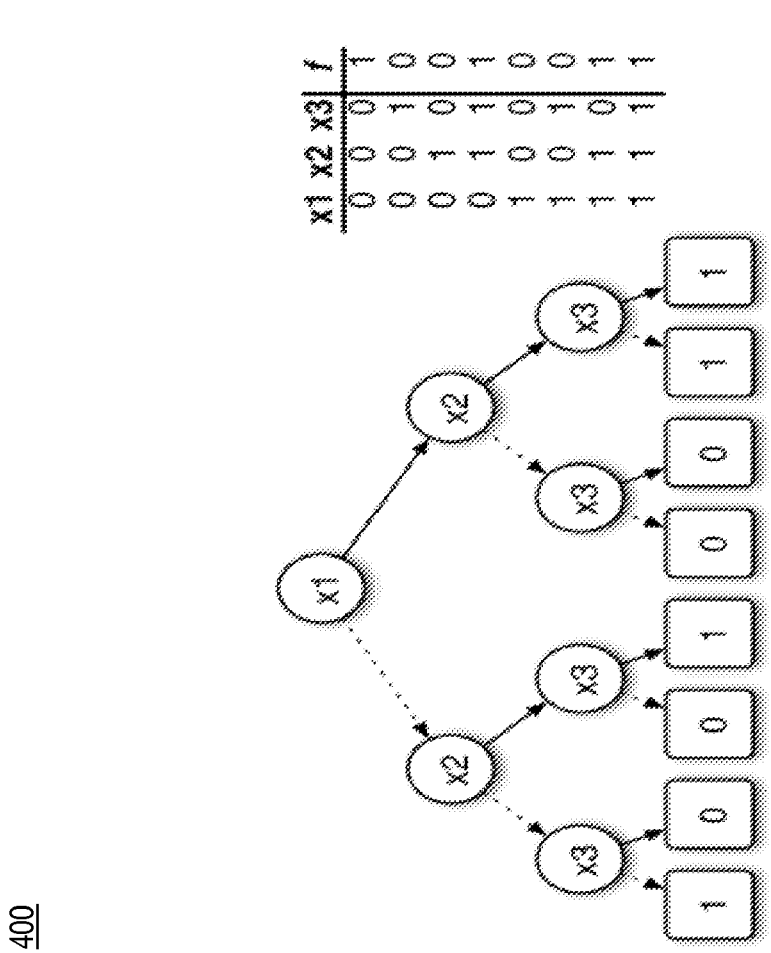

FIGS. 4A-4B are diagrams of a binary decision diagram 400 and a corresponding ROBDD 420 utilized in the processes of FIG. 3, according to various embodiments. Various ways may be used to convert an RDF graph into the representation of, for example, a BDD or an ROBDD. In one embodiment, general BDD encoding is based on creating a triple (a, b, c) in which pieces of information "a," "b," and "c" are represented using three bits per each piece of information. This encoding scheme results in a triple represented, for instance, as (101, 001, 011), that is in turn maintained in a dictionary, e.g., as (a=101, b=011, c=011). In another embodiment, the number of bits used for encoding is calculated based upon the size of an associated letter. In another embodiment, the number of bits used for encoding is a set value such as 32 or 64 bits. BDD encoding can be accomplished by performing logic-OR operations with each bit sequence associated with a query result. For instance, the BDD gets the following variable assignment for the nine variables: v1 & ~v2 & v3 & ~v4 & ~v5 & v6 & ~v7 & v8 & v9 ("BDD_prev"). Each variable is a bit. The satisfying variable assignment to this BDD is precisely the encoding of the above-mentioned triple. The constructed BDD is a graph and is serialized to a chosen format to be fed to a hash function.

The success of the system 100 relies on the uniqueness of ROBDDs. For example, a BDD constructed for a given information set is unique for a chosen variable order. An ROBDD independently constructed with the same variable order for the same information set is always the same over the semantic web or the smart space. The system 100 keeps an internal index of constructed ROBDDs. The values of the internal index depend on the order of local ROBDD constructions.

In addition, the system 100 creates an external index table (a "hash table"; see FIG. 5 for more details) in which each constructed ROBDD is given an ID (hereinafter "hash ID") by operating a hash function over its ROBDD graph structure. Ideally, the hash function would never produce the same hash ID for two different ROBDDs. The system 100 maintains the external index table to store each new, unique ROBDD in a column 540. FIG. 5 is a partial diagram of an external index table 500 utilized in the process of FIG. 3, according to one embodiment. This table further contains owner and access control information in a column 520 as well as the construction history of the ROBDD in a column 530.

The "access control" column 520 in the external index table 500 may be a simple implementation of allowing/disallowing access, or may be used as a link to an access control system of the underlying architecture, such as the credentials used in the semantic web. In one embodiment, hash101 is accessible for all, while hash26 is accessible only for Matti. Since hash31 is set as accessible for all group members, only group members can reconstruct a ROBDD corresponding to hash31 based on the construction history (e.g., BDD_OR (hash26,hash101)) of the ROBDD, since only group members have a decryption key from Matti regarding hash37 and hash12. If a non-group member receives hash31 and the construction history, the non-group member does not have sufficient information to reconstruct ROBDD corresponding to hash31 based on the construction history because the non-group member does not have the appropriate key. In another embodiment, the control access function sends only hash IDs while using some other mechanisms to communicate the corresponding ROBDD.

The system 100 further extends the external index table 500 by augmenting each ROBDD with keyed hash IDs (e.g., <hash34, keyid1>) as shown in the column 530 of the external index table 500. In this embodiment, a keyed hash function is used instead of the hash function. Algorithms such as HMAC-SHA1, HMAC-SHA-256, etc. can be used to calculate keyed hash IDs. To create a keyed hash, the system 100 serializes data of the ROBDD so that it is suitable for inputting to the keyed hash function. The system 100 then stores the keyed hash ID with the key ID in the external index table 500. There may be, for instance, several keyed hash IDs that correspond to the same plain hash ID in the table 500.

The system 100 encrypts the AugBDD graph as well as calculates the corresponding keyed hash ID. In other words, the system 100 uses two separate keys for ID calculation and for encryption. There are existing techniques for deriving keys from secrets. In one embodiment, there is a single group-specific key, where the members of the group share the group key. The separate keys can be derived from the group key with a key derivation function such as ANSI-X9.63-KDF. In one embodiment, the system 100 maps the key IDs to the single group key, and derives the hash or encryption functions when needed.

When communicating the different hash IDs, a plain hash ID forms the basis for the communication. A keyed hash ID may then be added in the communication along with a key ID, or even the AugBDD graph. This allows the recipient to ensure that the keyed hash ID can be created from the corresponding graph (or the plain hash ID) by using the produced key.

A keyed hash function allows entities to share the same secret key and to independently ensure that the resulting hash IDs were created by an entity having the secret key. For anti-replay protection, timestamp information is included in the key or the content. The keyed hash ID always includes a key ID, which corresponds to a previously shared key. When the system 100 receives an unknown key ID, the system 100 requests the graph (e.g., decision diagram) for the hash ID accompanied with the key ID. The sending party of the original ID can encrypt the graph with a previously known key. A group specific key is used to generate runtime distinct keys for both keyed hashing as well as for encryption. The keyed hash ID anonymizes the ROBDD, which allows this key ID be eavesdropped without compromising the sending party even if the eavesdropper has the corresponding ROBDD.

When the system 100 receives a keyed hash with a key ID, which is unknown, the system 100 initiates a separate authenticated key exchange procedure. The system 100 may mix in the communication both keyed hash IDs and plain hash IDs (i.e., not-keyed hash IDs). When constructing a hash ID, the system 100 includes whether a hash ID is 'keyed' or 'plain' (e.g., <hash31, plain>, <hash11, keyid4>). Key IDs may correspond to different groups, such as different social networks. A key ID together with an ROBDD graph constitutes a proof that the ROBDD has been constructed by the owner of the key ID.

With plain ROBDD graphs, the system 100 can provide keyed hash IDs calculated from that graph and the key IDs. This allows anyone with the key corresponding to the key ID to ensure that the ROBDD graph was generated by the owner of the key ID.

The "history" column 540 shows that a new ROBDD can be constructed by an internal BDD core operation bdd_apply (which constructs the BDDs based on different operations: and, or, not, implication, forall, exists, xor, if-then-else and their possible combinations). The new ROBDD is then hashed to form a hash ID, and this hash ID is maintained in the external index table in a column 510. As shown in FIG. 5, an ROBDD corresponding to hash 31 can be constructed or reconstructed by applying a BDD operation (e.g., BDD_OR) on the ROBDDs corresponding to hash IDs (e.g., hash26, hash101) listed in the construction history.

Since the ROBDD may be constructed by BDD operations from other ROBDDs, the system 100 sends a succinct representation of the ROBDD by sending this history of BDD operations (i.e., the construction history of the ROBDD) along with a hash ID. Sending only the succinct representation (e.g., hash ID) of the ROBDD and history reduces potential data traffic especially in cases where the construction of the ROBDD has been performed based on general components that are expected to be commonly available and unchanging (such as a representation of an ontology or typical search for (Matti, a, person) which constitutes a partial ROBDD). The construction history may be complete or partial (up to a parameterized number).

For each incoming ROBDD graph, the system 100 repeats the same operations of generating a hash ID and storing the hash ID and a corresponding construction history in the external index table (e.g., hash table). For each incoming hash ID, the system 100 searches in the external indexing table for the incoming hash ID. When a matching hash ID is found in the ID column of the external index table, the system 100 associates the received hash ID with the ROBDD graph corresponding to the marched hash ID. Otherwise, the system 100 requests a sending party to send the ROBDD graph corresponding to the received hash ID or missing information for reconstructing the ROBDD graph. In one embodiment, this implementation can be added to the smart space, or built on top of the smart space.

Figure 6A:
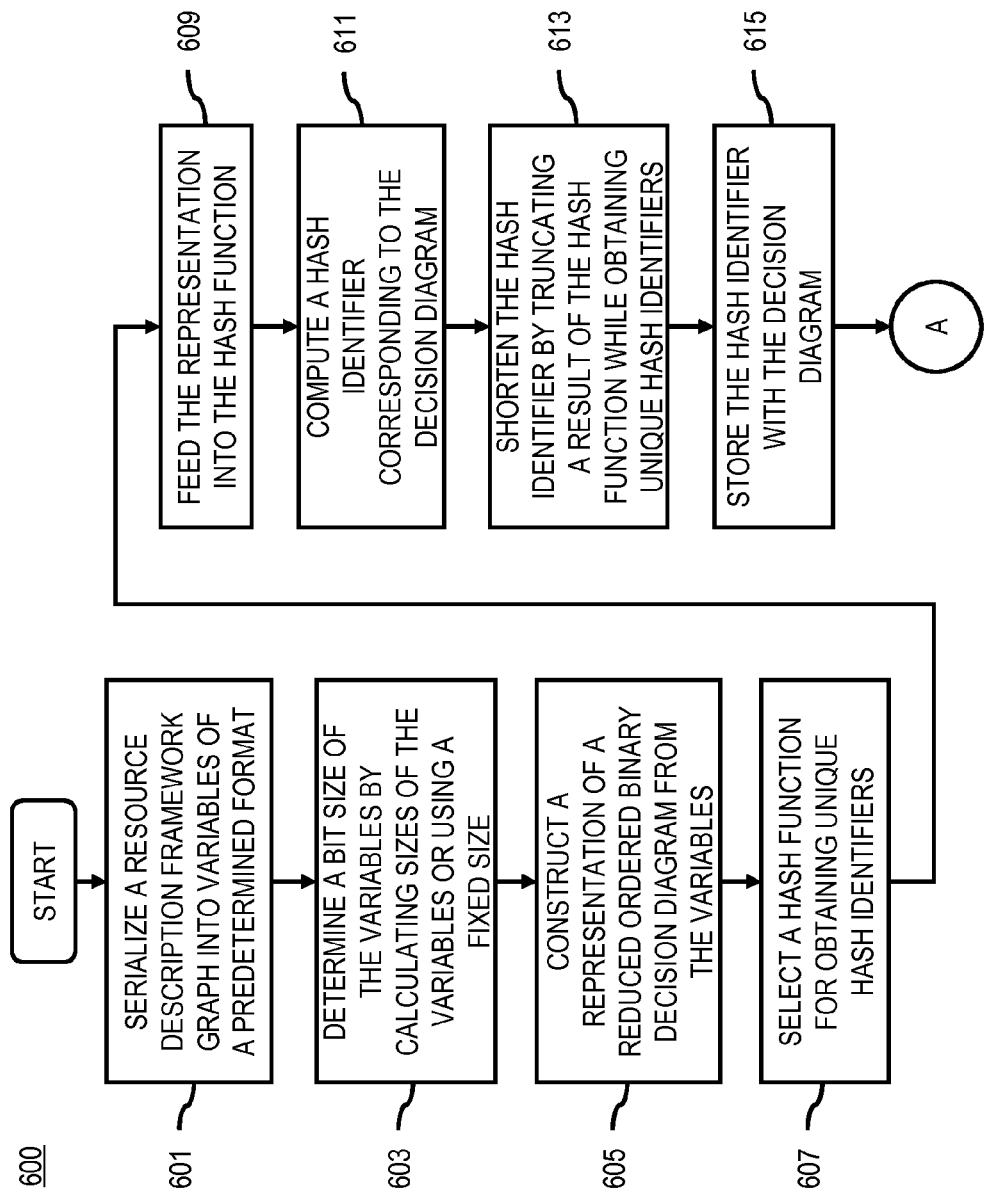
FIG. 6A is a flowchart of a process for encoding decision diagrams, according to one embodiment.
Figure 6B:
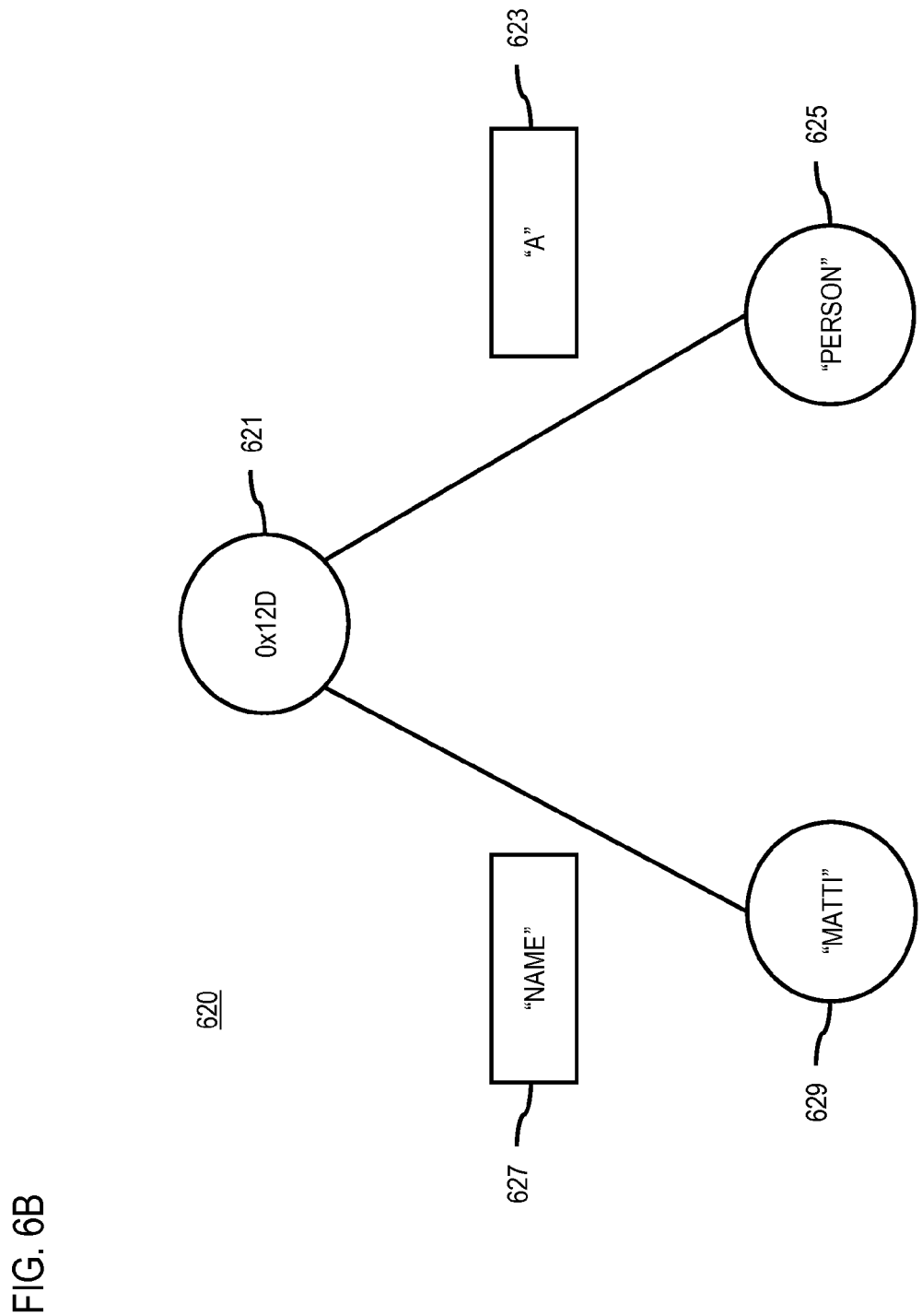
FIG. 6B is a RDF graph encoded by the process of FIG. 6A, according to one embodiment.

FIG. 6A is a flowchart of a process for encoding decision diagrams, according to one embodiment. In one embodiment, the hash identifier application 107a performs the process 600 and is implemented in, for instance, a chip set including a processor and a memory as shown in FIG. 12. The process 600 of FIG. 6A is described with respect to a FIG. 6B depicting an instance of a simple RDF graph, according to one embodiment. In step 601 of FIG. 6A, the hash identifier application 107a serializes a resource description framework graph into variables of a predetermined format. By way of example, the hash identifier application 107a constructs a ROBDD to encode a simple RDF graph states stating that an instance 621, "(0x12D)," is "a" (e.g., process 623) "Person" (e.g., node 625) and has a "name" (e.g., process 627) of ""Matti" (e.g., node 629)."

To simplify the discussion, there are only two vertices extending from instance 621 "0x12D" and there is no subtree below the node 625 "Person" or the node 629 "Matti." However, it is contemplated that there can be any number of vertices and/or subtrees below any of the nodes (e.g., nodes 625 or 629) of the RDF graph 620. In addition, there are many ways or conditions for encoding the encode this RDF graph 620 into bit vectors. For instance, the bit size can be three as discussed previously, or four as discussed below. Different bit sizes result in, for instance, different numbers of variables which lead to ROBDD graphs of different sizes and shapes. In addition, different combinations of values can be assigned to the variables. In the example of FIG. 6B, the RDF graph 620 is represented by the following two triples:

0x12D, a, Person
0x12D, name, "Matti"

Returning to FIG. 6A, the hash identifier application 107a then determines a bit size of the variables by calculating sizes of the variables or using a fixed size (Step 603). In one embodiment, the bit size is fixed at a predefined size across the system 100 to, for instance, ensure the consistency of encoding. In the example of FIG. 6B, the hash identifier application 107a sets five BDD variables representing the subject (e.g., the instance 621 "0x12D"), the predicates (e.g., process 623 "a" and process 627 ", name") and the objects (e.g., node 625 "Person" and node 629, "Matti"). The hash identifier application 107a then selects a number of bits for representing and encoding the subject, the predicates, and the objects.

As shown below, the bit size for the example of FIG. 6B is fixed as three bits across the system 100. Accordingly, the hash identifier application 107a encodes these variables in three bits and saves the encoding information in a dictionary as follows:

0x12D<=>101
a<=>001
Person<=>011
name<=>010
"Matti"<=>100

The hash identifier application 107a constructs a representation of the ROBDD from the variables (Step 605 of FIG. 6A). With respect to the example of FIG. 6B, the hash identifier application 107a uses the encoded variables to create a ROBDD graph consisting of nine one-bit variables, where the first three variables are interpreted as a variable encoding the first field of the triple, the second three variables are interpreted as a variable encoding the second field, and the last three variables are interpreted as a variable encoding the third field of the triple. This ROBDD graph is unique for the chosen triples and variable ordering, resulting in representation of the following encoded triples:

101 001 011
101 010 100

As another example, when the bit size is fixed at four as 4 bits across the system 100, The hash identifier application 107a encodes these variables in four bits and saves the encoding information in a dictionary as follows:

0x12D<=>0000
a<=>0001
Person<=>0010
name<=>0011
"Matti"<=>0100

Accordingly, the hash identifier application 107a uses the encoded variables to create a ROBDD graph consisting of 12 one-bit variables, where the first four variables represent the first field of the triple, the second four variables represent the second field of the triple, and the last four variables represent the third field of the triple. The ROBDD graph representing the following encoded triples is as follows:

0000 0001 0010
0000 0011 0100

As shown in FIG. 6A, the hash identifier application 107a selects a hash function for obtaining unique hash identifiers (Step 607), and feeds the representation into the hash function thereby computing the hash identifier (Step 609) thereby computing the hash identifier corresponding to the decision diagram (Step 611). Like the size of the bit encoding, the hash function is usually chosen beforehand to be adhered to by all users and/or components of the system 100. However, if the relevant information for choosing the hash function is not available, the hash identifier application 107a chooses the hash function heuristically as in the embodiment.

Optionally, the hash identifier application 107a shortens the computed hash identifier by truncating a result of the hash function while obtaining unique hash identifiers (Step 613). The hash identifier application 107a then stores the hash identifier with the decision diagram (Step 615), for example, in the external index table 500 shown in FIG. 5.

Figure 7B:
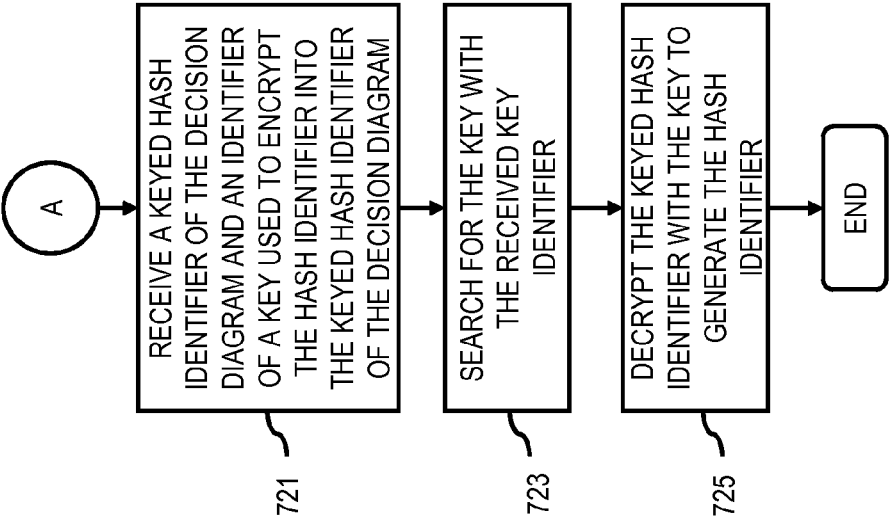
FIGS. 7A-7B are flowcharts of a processes for encoding and utilizing hash identifiers, according to various embodiments.
Figure 7A:
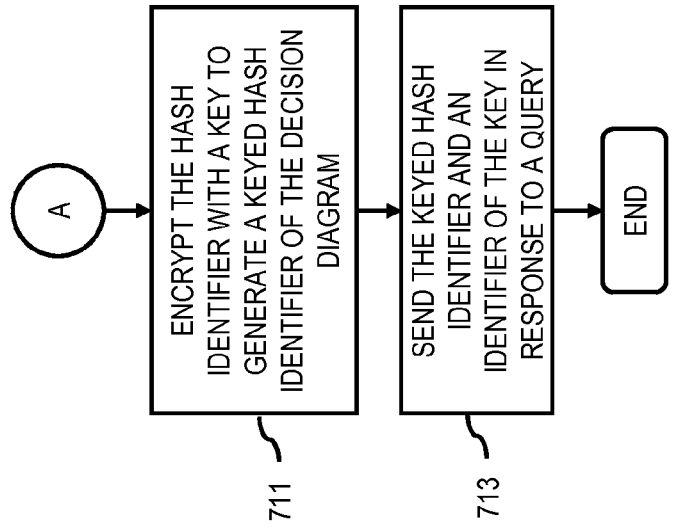

FIGS. 7A-7B are flowcharts of processes for encoding and utilizing hash identifiers, according to various embodiments. In one embodiment, the hash identifier application 107a performs the processes 710, 720 and is implemented in, for instance, a chip set including a processor and a memory as shown in FIG. 12. In step 711, the hash identifier application 107a encrypts the hash identifier with a key to generate a keyed hash identifier of the decision diagram. The hash identifier application 107a then sends the keyed hash identifier and an identifier of the key in response to a query (Step 713). In step 721, the hash identifier application 107a receives a keyed hash identifier of the decision diagram and an identifier of a key used to encrypt the hash identifier into the keyed hash identifier of the decision diagram. The hash identifier application 107a then searches for the key with the received key identifier (Step 723), and decrypts the keyed hash identifier with the key to generate the hash identifier (Step 725).

Figure 8:
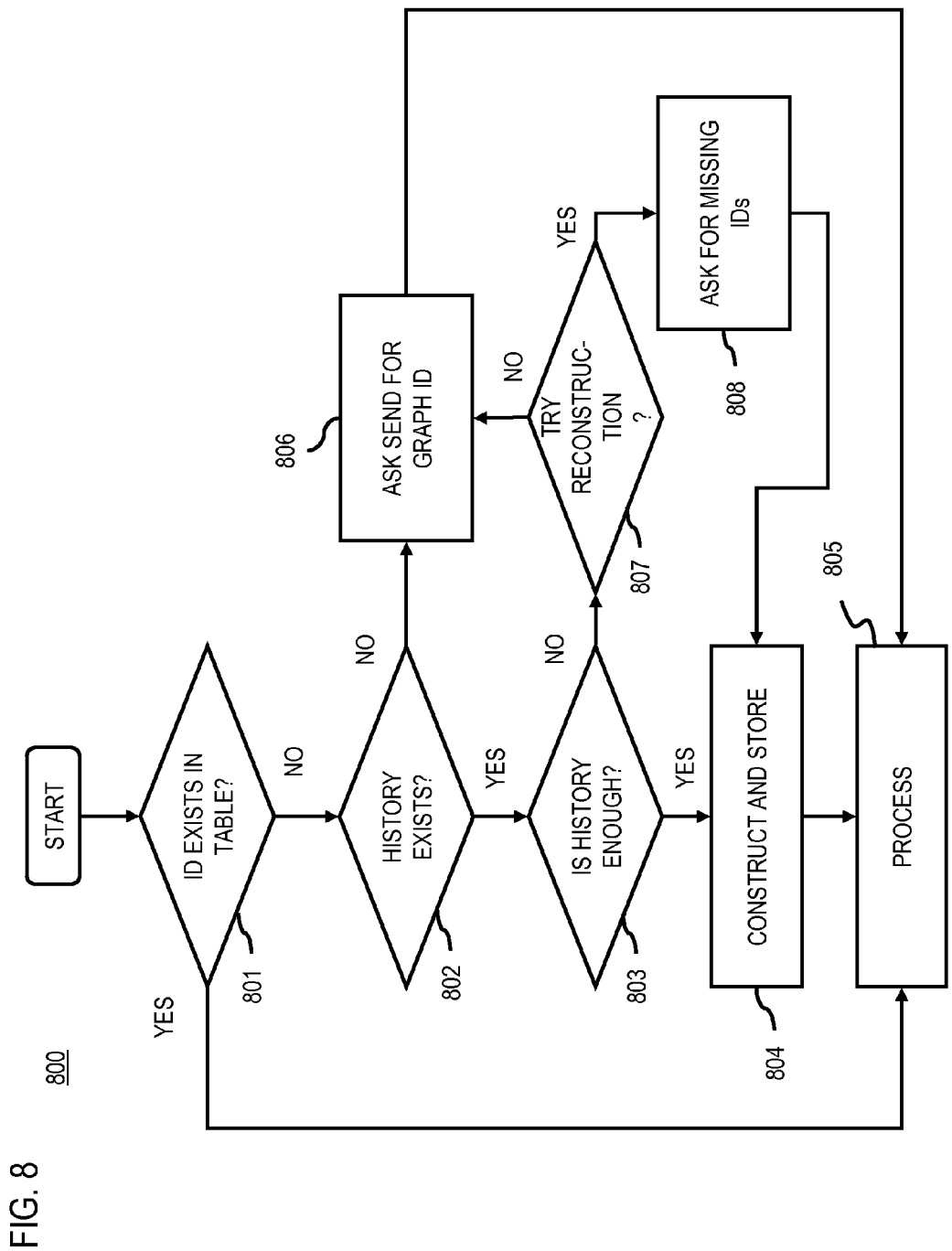
FIG. 8 is a flowchart for handling hash identifiers, according to one embodiment.

The processes for handling incoming hash IDs are shown diagrammatically in FIG. 8, in various embodiments. The first scenario is that the received hash ID is found in the ID column of the external indexing table (Step 801). The system 100 uses the received hash ID from the sending party, and proceeds directly to retrieve the ROBDD graph from the external index table or perform any other action relating to the ROBDD (Step 805).

The second scenario is that the received hash ID is not found in the ID column of the external indexing table (Step 801) and the hash ID does not exist in the construction history of the external indexing table (Step 802). The system 100 requests the corresponding ROBDD graph of the AugBDD from the sending party (Step 806), and then proceeds to other actions (Step 805).

The third scenario is either that the hash ID exists in the construction history of the external indexing table (Step 802), or the hash ID (e.g., hash31) is received with the construction history (e.g., BDD_OR(hash26,hash101)) of the ROBDD (i.e., [optional history]). When the available construction history (optionally including received construction history) is determined as complete or sufficiently complete enough (e.g., all hash ID(s) involve in the construction history of the unknown ROBDD have complete entries in the external indexing table) (Step 803), the system 100 reconstructs the ROBDD from its construction history and the associated hash ID(s). The system 100 saves the reconstructed ROBDD graph in the external indexing table (Step 804) and then proceeds to other actions (Step 805).

In another scenario, the system 100 may determine that the construction history is available but is not complete (e.g., does not identify all hash IDs or Boolean operations needed to reconstruct the ROBDD). For example, some other hash IDs (e.g., hash37, hash12) involved in the construction history (via hash26) of the unknown ROBDD have no complete entries in the external indexing table (Step 803). As such, the unknown ROBDD corresponding to the hash ID (e.g., hash31) cannot be constructed from the available construction history (optionally including received construction history) due to the missing hash ID(s): hash37, hash21.

The system 100 then determines whether to try to reconstruct the unknown ROBDD (Step 807). As a receiving party, the system 100 has a choice to request any missing hash ID(s) included in the construction history of the received hash ID to enable reconstructing the unknown ROBDD, or to request the unknown ROBDD graph corresponding to the hash ID. For example, the decision may depend on whether the system 100 wants to use its own computing resources over network resources. However, if the relevant information is not available, the choice is heuristic (i.e., experience-based, such as a rule of thumb).

If deciding to query for the unknown ROBDD, the system 100 queries for the corresponding ROBDD graph of the AugBDD from the sending party (Step 806), and then proceeds to other actions (Step 805). When choosing to request the unknown ROBDD graph, the sending party can either send the ROBDD graph, or not to send it in order to push the system 100 to construct the ROBDD graph itself. In another embodiment, the sending party communicates only a part or parts of the ROBDD graph so as to distribute the workload between itself and the system 100. Both the sending partying and the system 100 can freely turn off the sending or accepting of hash IDs and the consecution history, and communicate full ROBDD graphs instead. In other words, the history information allows the sending party and the system 100 to divide the AugBDDs and to recompose them from partly existing sources, which can be used as means of delegating computation to the parties.

If deciding to reconstruct the unknown ROBDD, the system 100 queries for the missing hash ID(s) from the sending party (Step 808), reconstructs the ROBDD from the available construction history and the involved hash IDs (including received missing hash ID(s)), and saves the reconstructed ROBDD graph in the external indexing table (Step 804), and then proceeds to other actions (Step 805). When the system 100 chooses to request the missing hash ID(s), it shoulders the computation and network resources and cost to reconstruct the ROBDD.

The embedding of an ROBDD in an AugBDDs means that the ROBDD graph is converted to some representation in known ways. This representation is then augmented with a header (or postfix) which contains the hash ID and a section describing the construction history of the ROBDD. The system 100 can choose any encoding for this, such as a simple implementation that writes out the hash IDs and operations in a reverse Polish notation ("RPN") which is a mathematical notation wherein every operator follows all of its operands. An example of this notation is: "ab123 34cd3 AND 23dfg OR."

This example expresses (1) taking two ROBDDs represented by hash IDs ab123, 34cd3, (2) performing the BDD AND operation on them, and then (3) using that result to OR with an ROBDD represented by a hash ID 23dfg. In another example, the system uses only one hash ID instead of the two ANDed hash IDs.

For adding the implementation to the smart space, the system 100 augments the smart space protocol with a specific get_graph message which has the hash ID as a parameter and which is a return message to get the actual ROBDD graph representation. Alternatively, the get_graph message triggers another smart space message (recursively, if necessary) to get the complete ROBDD graph.

In practice, the system 100 accepts a hash function with a sufficiently low probability of producing same hash IDs for different ROBDDs. The hash function can be parameterized so that the resulting hash IDs have a very high probability to be unique. Instead of communicating representations of ROBDD graphs, the system 100 communicates the hash IDs. The receiving party can then compare the hash IDs with the hash IDs stored in the receiving party's external index table. For those received hash IDs that are unknown to the receiving party (i.e., which are not found in the external index table of the receiving party), the receiving party can request the actual ROBDD graphs to be sent thereto. The receiving party then updates its external index table to contain the hash IDs and the corresponding ROBDD graphs.

In one embodiment, the hash function operates one-way such that the information of the ROBDD graph cannot be reconstructed based only on the hash ID. As such, the system 100 builds an access control mechanism for the hash IDs. For example, certain hash IDs are not allowed to be communicated with particular parties or not allowed at all to be communicated externally. In another embodiment, the system 100 further tracks whether a ROBDD graph or other information has been sent out and whether the information has been sent via a potentially insecure channel or network.

The "Final Technical Report—Specification Of A Security Architecture For Distributed Terminals" ("Final Technical Report," incorporated herein by reference in its entirety) published by the Information Society Technologies in November 2002 (p. 40-41) described on pages 40-41 estimates about the probability of the collision of keyed hashes (Message Authentication Codes—MACs), when the key was fixed. The Final Technical Report mathematically proved collision resilience of the keyed hashes. Instead of MACs, the system 100 generates hash IDs and reduces a probability of identical hash IDs for different ROBDDs to be as low as possible. The Final Technical Report used a Reed-Solomon based hash function by first applying a one-way hash function (such as SHA-1) to the data and then inputting the outputs from the hash function to a Reed-Solomon code, to provide sufficient security. In one embodiment of the invention, the hash function is composed of a one-way hash function and a Reed-Solomon based hash function. In some other embodiments, the hash functions do not need to be composed with a Reed-Solomon based hash function. Well known Reed-Solomon codes are rather long with very high minimum distance. If IDs are 4 hexadecimal digits long, the probability for two different ROBDDs to have the same ID is approximately 2^-12. By increasing the length of the IDs to 5 hexadecimal digits long, the probability becomes approximately 2^-17. The Final Technical Report assumed that 128-bit truncated SHA-1 provides a sufficient security level. This approach keeps a low probably of ROBDD collision without considerably increasing the key length or the length of the hash IDs. This means that if ROBDD1 is given, it is extremely difficult (in cryptographic sense) to find another ROBDD2 such that f(ROBDD1)=f(ROBDD2). To further reduce the possibility of providing two different ROBDDs with the same hash ID, the system 100 deploys SHA-256, which means that hash IDs are 256-bit long. Using suitable truncation of a hash function provides decent length hash ID. For example, 16-bytes long hash IDs sufficiently ensure that it is nearly impossible to create ROBDD2 such that ID_BDD1=ID_BDD2 and that the occurrence of communicating an ambiguous hash ID is very unlikely.

The system 100 sends and receives hash IDs (i.e., hash values of ROBDDs), instead of the ROBDDs. Since the hash values are shorter than the values representing the ROBDD graphs, data traffic is significantly reduced at an acceptable rate of false positives. In another embodiment, short hash values (e.g., truncated hash values) are used, when there is a large amount of ROBDDs. For a RDF graph containing a large amount of data, the system 100 may process only a part or parts of the RDF graph that are feasible to be constructed as an AugBDD.

A primitive, which mirrors the get_graph (in earlier IPR), allows any entity to request signing of a given ROBDD graph by a key of the recipient. The resulting message will be a keyed hash ID for the ROBDD graph, and the key ID used for generating the keyed hash. This allows an entity to obtain a signed keyed hash from a trusted third party based on the content of the ROBDD graph and its construction history. Upon receiving a request for signing, a web service platform may examine the ROBDD graph and its construction history to decide whether it signs the graph or with what key it signs the graph. This encapsulates the trust level between the requester and the web service platform. The decision of whether the web service platform signs the AugBDD can be based on (1) the content of the AugBDD, (2) whether the signer has the hash ID in its own index table (so it already knows that the AugBDD is valid), (3) the smart space login credentials of a requester node are trustworthy, and combination of the above.

When the web service platform signs the AugBDD with a keyed hash ID and returns the corresponding key ID, the original requestor cannot regenerate the keyed hash ID since it has no key corresponding to the key ID, but it can always deliver the keyed hash ID and the key ID to a third party who then may have the key corresponding to the key ID. Alternatively, the third party may request the web service platform to validate the hashed ID and the key ID.

For efficiency reasons, the system 100 uses hash IDs that are as short as possible. Rather than using the hash IDs generated based upon a standard hash function like SHA-1, the system 100 truncates the hash IDs, for example to 128-bits. In another embodiment, the system 100 uses another standard hash function implementation such as SHA-256, and truncates the results. As discussed, 128-bit is adequate. Nevertheless, if truncating the hash IDs into lower values, other countermeasures may be adapted in order to prevent the forgery of the ROBDDs. When security and privacy are secured via other means, the system 100 only needs to ensure that two ROBDDs do not accidentally collide with each other, and 64-bit truncation is adequate. The implementation of the truncation size can be parameterized. By way of example, the simple Reed-Solomon based hash function implementation described in the Final Technical Report is used. The keyed hash IDs can be truncated by applying suitable truncation to keyed-Hash Message Authentication Code (HMAC or KHMAC) functions. However, the more the keyed hash IDs are truncated, the easier they can be forged (e.g., a hostile party can create a hash ID for a previously known AugBDD just by guessing suitable keys).

Figure 9:
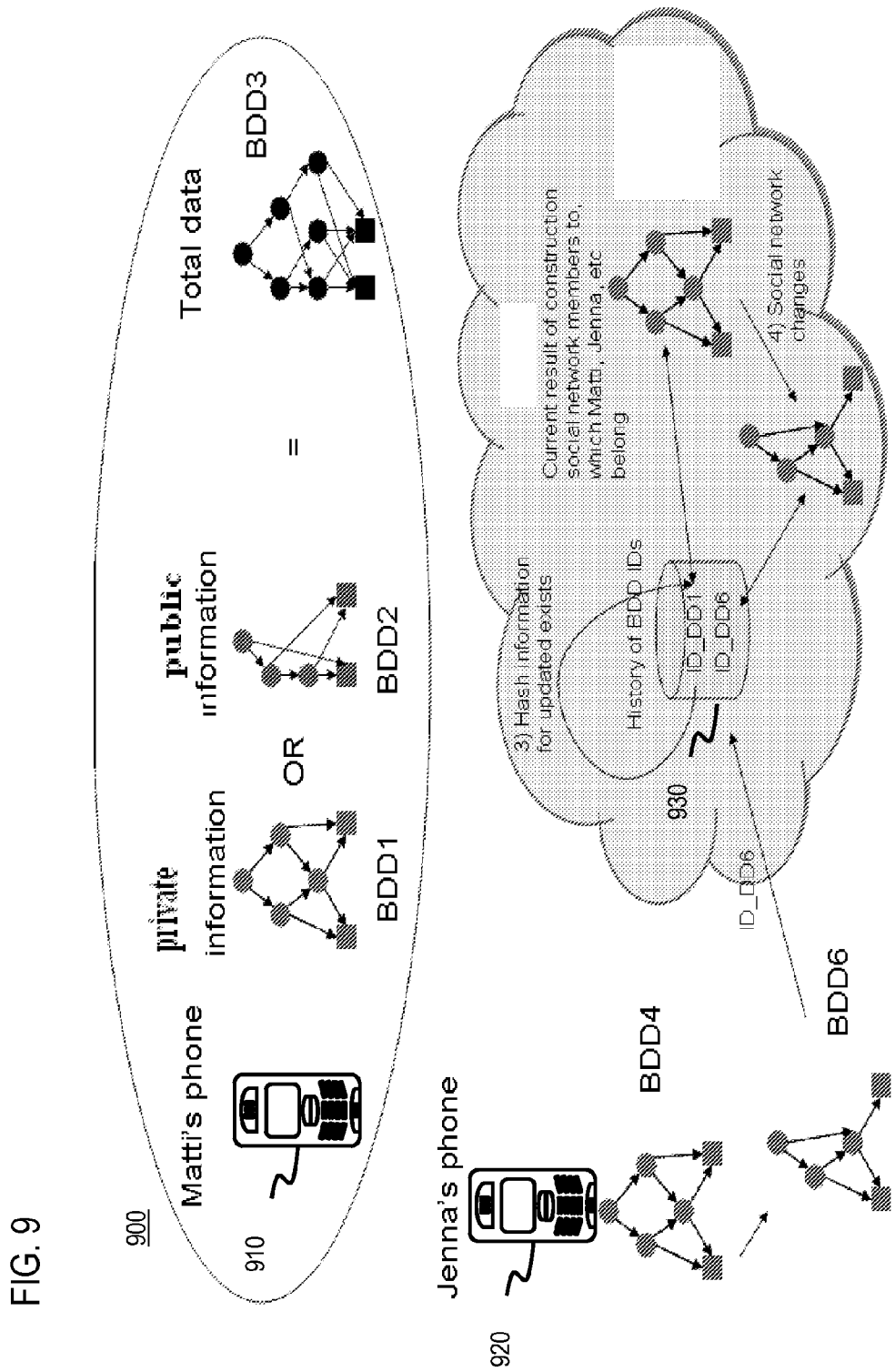
FIG. 9 is diagram of a social network utilize in the process of FIG. 3, according to one embodiment.

In one embodiment, the system 100 is adapted to a social network. Considering a situation shown in FIG. 9, users (e.g., Jenna and Matti) want to participate in the social network with their mobile terminals 910, 920. In other embodiments, the users participate via personal computers or different kinds of devices or equipment. In this example, both Jenna and Matti have information that is public (such as their moods) and information that is private (such as their bank account balances). The private and public information are constructed as AugBDDs and given unique hash IDs. The AugBDDs can be combined to form more complete information of the users and given another unique hash ID.

The social network has friendship relations and public information of its participants. These relations and information are formed into RDF graphs, which can be constructed as AugBDDs and published at a central location. The AugBDDs may contain history information of its construction. An ROBDD encoding dictionary may be available for all participants. A decision diagram compression value, i.e., the data size of a decision diagram based on the query result data, may be determined by considering the data size of the query result data. The above-mentioned triple set can then be concatenated to generate a bit sequence, which may be a query result bit sequence. In this regard, the discussed encoding keys, i.e., a=101, b=001, and c=011, can be stored in a dictionary. If necessary, the dictionary is transmitted along with the ROBDDs or the AugBDDs.

A representation for Matti's information is provided as follows:
:Matti a :Person;
:Matti :bankaccount "50000";
:Matti :mood :happy.

Where :mood is public information and :bankaccount is private information. The same information exists for other participants. The system 100 constructs ROBDDs ("BDDs") from RDF triples/graphs representing a piece of information (e.g., :Matti a :Person.) and assigns them with IDs (e.g., BDD_ID 0) as follows:
:Matti a :Person.=>BDD_ID 0
:Matti :bankaccount "50000".=>BDD_ID 1
:Matti :mood :happy.=>BDD_ID 2

The BDD_IDs are results of a hash function and thus are unique and longer than one digit. The integers (e.g., 1, 2, etc.) are used here to simplify the discussion. The system 100 creates public and private information and the associated construction history as follows:
Matti_secret=BDD_OR(BDD_ID_0, BDD_ID_1)=> BDD_ID 3
Matti_public=BDD_OR(BDD_ID_0, BDD_ID 2)=> BDD_ID 4
Matti_all=BDD_OR(BDD_ID 3, BDD_ID 4)=>BDD_ID 128

The public and private AugBDDs are divided in a way to share the private information independently from the public information. Meanwhile, the private information BDD1 and public information BDD2 of Matti are combined as BDD3 as shown in the upper portion of FIG. 9. In another embodiment, the system 100 traverses the history information deeper so that the #Matti_all is:

Matti_all=BDD_OR(3=BDD_OR(BDD_ID_0, BDD_ID 1), 4=BDD_OR(BDD_ID_0, BDD_ID 2))

The system 100 repeats this procedure for Jenna:
:Jenna a :Person;=>BDD_ID 5
:Jenna :bankaccount "5000";=>BDD_ID 6
:Jenna :mood :inlove.=>BDD_ID 7
Jenna_secret=BDD_OR(5,6)=BDD_ID 14
Jenna_public=BDD_OR(5,7)=BDD_ID 15
Jenna_all=BDD_OR(14,15)=BDD_ID 16

The system 100 then creates a social network for some participants:
:Matti :wife :Mervi.=>BDD_ID 20
:Matti :friend :Jenna.=>BDD_ID 21

The fact that :Matti :friend :Jenna implies :Jenna :friend :Matti. Although Jenna :friend :Matti should be assigned with its own ID, the relevant assignment and discussion are omitted to simplify the discussion. The system 100 adds the social relation information to the public information:
Matti_public=BDD_OR(4,21)=>BDD_ID 22 # Add jenna
Matti_public=BDD_OR(22,20)=>BDD_ID 23 # Add mervi
Jenna_public=BDD_ID 24
Mervi_public=BDD_ID 25

The same procedure is repeated for other participants. The description of a protocol of agreeing to be friends in the social network is also omitted here. The system 100 goes straight to generate BDD_IDs for #Jenna_public and #Mervi_public. The procedure is the same as discussed above. The ID values are assigned in the sequence of discussion.

Since all of the mentioned participants belong to the same social network, the system 100 generates an aggregate BDD that corresponds to the social network in which Matti, Jenna and Mervi belong along with their public information as follows:
Nykanen_social=BDD_OR(23,24)=BDD_ID 26
Nykanen_social=BDD_OR(26,25)=BDD_ID 27

When participating in a social network, the public information is shared and can reside anywhere (e.g., any information stores) in the smart space, and at least at the central location (e.g., a centralized information store). In another embodiment, the #Nykanen_social (27) with its history information is sent to all participants if determined as necessary.

A change in public information, such as the mood of Matti, triggers construction of a new AugBDD and a new hash ID, which is then communicated to at least the central location. If the resulting change produces a ROBDD graph that has been generated before, only the hash ID is sent to the central location. In the smart space, the information stores usually query for the hash IDs and the construction history, and rarely ask for a complete ROBDD graph due to its size. Now considering a change in a status of Matti, i.e., he changes his mood from :happy to :hungry, and then later back to :happy. The system 100 generates a new ID as follows:
:Matti :mood :hungry.=>BDD_ID 28.

The system 100 then updates Matti's public information as follows:
Matti_public=BDD_OR(BDD_ID 0, BDD_ID 28)=>BDD_ID 29

When :Matti switches back to :happy :mood, the old ID becomes valid (provided no other changes have occurred) and only the old IDs are sent to the central location. The central location can use the old IDs as was before the mood change.

Since the original #Matti_public was included in the social graph #Nykanen_social, the system 100 can remove the original public ID from a local copy of the #Nykanen_social information and adds the new #Matti_public to it (both using BDD operations). The resulting BDD is hashed to a new BDD_ID (assuming it is truly new). The system 100 can publish that BDD_ID at the central location along with its construction history. When an information store does not recognize the hash ID (i.e., not available in the ID column of the external index table), it asks the central location or other information stores for the complete ROBDD graph. Another way of dealing with the unrecognized/unknown ID is to look at the construction history of the ROBDD (i.e., tracking a chain of construction events back and forth between the history column and the ID column of the external index table for each hash IDs involved in the construction events) and only ask for the missing elements (e.g., hash37, hash12) in the graph and construct the ROBDD graph at the information store. The missing elements refer to hash IDs involving in construction events of other hash IDs in the table, but their own construction history is not available in the external index table.

In another embodiment, Jenna uses Matti's public information BDD4 (e.g., which is combined from BDD0: Matti is a person or BDD2: Matti is happy as mentioned) to create a hash ID: BDD_ID 6 (i.e., ID_DD6 in FIG. 9) for her private information BDD6 (i.e., Jenna's bank account balance is $5,000). As shown in the lower portion of FIG. 9, the construction history of BDD6 thus includes BDD_ID4, BDD_ID0 and BDD_ID 2. When Matti's mode changes, BDD6 changes according to data store in a database 930 containing construction history of BDD IDs. Both public information and private information can be available at a social network but under different level of access control as shown in the column 520 of the external index table and discussed previously.

Figure 10:
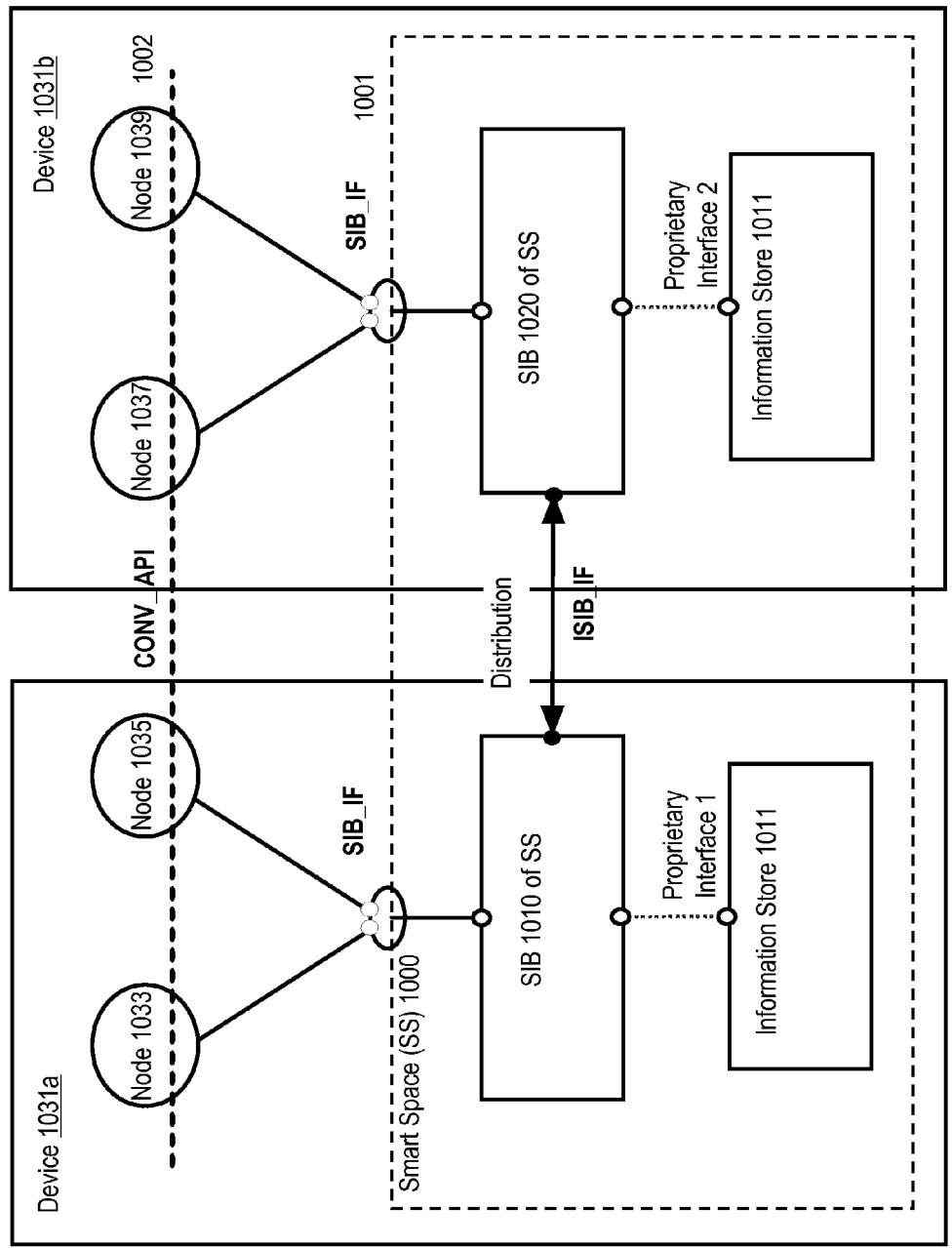
FIG. 10 is a diagram of a smart space structure, according to one embodiment.

The system 100 can be use in a semantic web, or in a smart space architecture to be available in all locations to all nodes and entities. FIG. 10 is a diagram of a smart space structure, according to one embodiment. Each smart space 1000 includes smart space nodes/objects 1033, 1035, 1037 and 1039 and semantic information brokers (SIB) 1010, 1020 which form the nucleus of the smart space 1000. Each SIB is an entity performing triple governance in possible co-operation with other SIBs for one smart space. A SIB may be a concrete or virtual entity. Each SIB also supports the smart space nodes/objects 1033, 1035, 1037 and 1039 e.g., a user, a mobile terminal, or a PC) interacting with other SIBs through information transaction operations. The devices 1031a, 1031b may be any devices (e.g., a mobile terminal, a personal computer, etc.) or equipment (e.g., a server, a router, etc.). By way of example, RDF is used in the smart space 1000. The triple governance transactions in the smart space 1000 uses a smart space Access Protocol (SSAP) to, e.g., join, leave, insert, remove, update, query, subscribe, unsubscribe information (e.g., in a unit of a triple). A subscription is a special query that is used to trigger reactions to persistent queries for information. Persistent queries are particular cases of plain queries.

The physical distribution protocol of a smart space (i.e., SSAP) allows formation of a smart space using multiple SIBs. With transactional operations, a node/object produces/inserts and consumes/queries information in the smart space 1000. As distributed SIBs belong to the same smart space 1000, query and subscription operations cover the whole information extent of a smart space.

FIG. 10 shows an implementation structure of the system 100 in the smart space (SS) 1000, the smart space 1000 is depicted in the box in a broken line 1001 (as the boundary of the smart space). There are two devices 931a, 931b connected to the smart space. In the upper part of FIG. 10, a dotted line 1002 shows the boundaries of the devices. The devices can be mobile terminals, personal computers, servers, or the like. Each device has nodes (e.g., two) therein. Each node represents a knowledge processor (KP). KPs are entities contributing to inserting and removing contents as well as querying and subscribing content according to ontology relevant to its defined functionality. A KP needs one or more partner KPs for sharing content and for implementing an agreed semantics for the used ontology. With this implementation structure, the smart space serves private and public entities in different business domains A, B using the devices 1031a, 1031b and KPs running in the business domains A, in order to support the private and public entities to access information services.

In this embodiment, the internal and external indexing tables are embedded in the SSAP protocol at SIB_IF or ISIB_IF upon an "insert" protocol message. To build itself on top of the smart space protocol, the system 100 uses ontological constructs for the hash IDs, which is, for instance, a predefined smart_space_robdd_id concept. The SIB_IF is an interface between the SIBs and a device, and the ISIB_IF is an interface between two SIBs.

In one embodiment, the approach described herein is implemented at the interfaces SIB_IF and ISIB_IF of the system 100 to transmit the hash IDs. In other embodiments, one or more application programming interfaces (APIs) (e.g., third party APIs) can be used in addition to or instead of SIB_IF and ISIB_IF. The approach described herein provides performance gains while allowing multiple proprietary implementations of information stores in the smart space 1000 according to FIG. 10. The decoding complexity for developing an application is buried below a convenience API (CONV_API) according to FIG. 10. Similarly, the tools for a local (at the node level) information search are provided as a part of a convenience library. However, if a malicious node produces metadata that exponentially increases a graph size (e.g., ROBDD size), the system 100 takes countermeasures such as conditional BDD encoding, and conventional node authentication methods, etc.

The augmentation of construction history and other information related to the ROBDD defines the ID of the data set described by the ROBDD (e.g., an ROBDD that has been embedded in the AugBDD). In one embodiment, the smart space protocol messages are checked for hash ID consistency by (1) checking for the correct (according to ontology) types of hash IDs in term of a range and a domain of the instances that have a defined property between them, and (2) checking for a correct number of hash IDs connected by the defined properties. In other words, the (1) and (2) mechanisms are applied to detect the smart_space_robdd_id concept within the smart space messages and then perform the checking for the availability of hash IDs from the external index table. The request for a missing hash ID can then be executed via a smart space query. This query relies upon the ROBDD graphs being available in a SIB in the smart space. The AugBDDs can be sent over to a remote system that uses the AugBDDs locally to check the consistency of the hash IDs or other properties in local information stores, which allows checking for ontology conformance without direct access to the ontology description.

The processes described herein for encoding decision diagrams may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
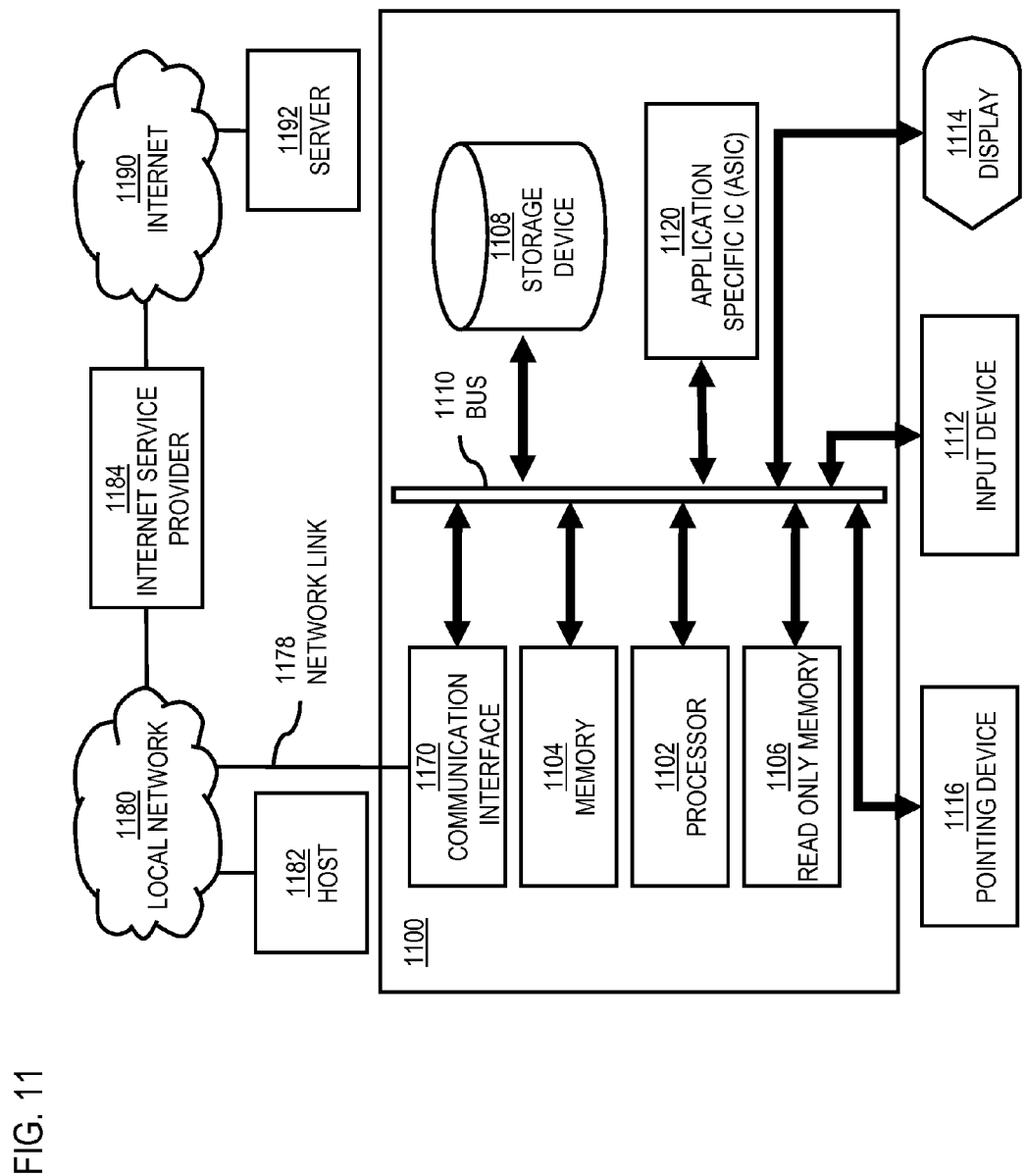
FIG. 11 is a diagram of hardware that can be used to implement an embodiment of the invention.

FIG. 11 illustrates a computer system 1100 upon which an embodiment of the invention may be implemented. Computer system 1100 is programmed (e.g., via computer program code or instructions) to encode decision diagrams as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of encoding decision diagrams.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to encode decision diagrams. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for encoding decision diagrams. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for encoding decision diagrams, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection between the communication network 105 to the UE 101 for encoding decision diagrams.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server host 1192 connected to the Internet hosts a process that provides a service in response to information received over the Internet. For example, server host 1192 hosts a process that provides information representing video data for presentation at display 1114.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set 1200 upon which an embodiment of the invention may be implemented. Chip set 1200 is programmed to encode decision diagrams as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of encoding decision diagrams.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to encode decision diagrams. The memory 1205 also stores the data associated with or generated by the execution of the inventive steps.

Figure 13:
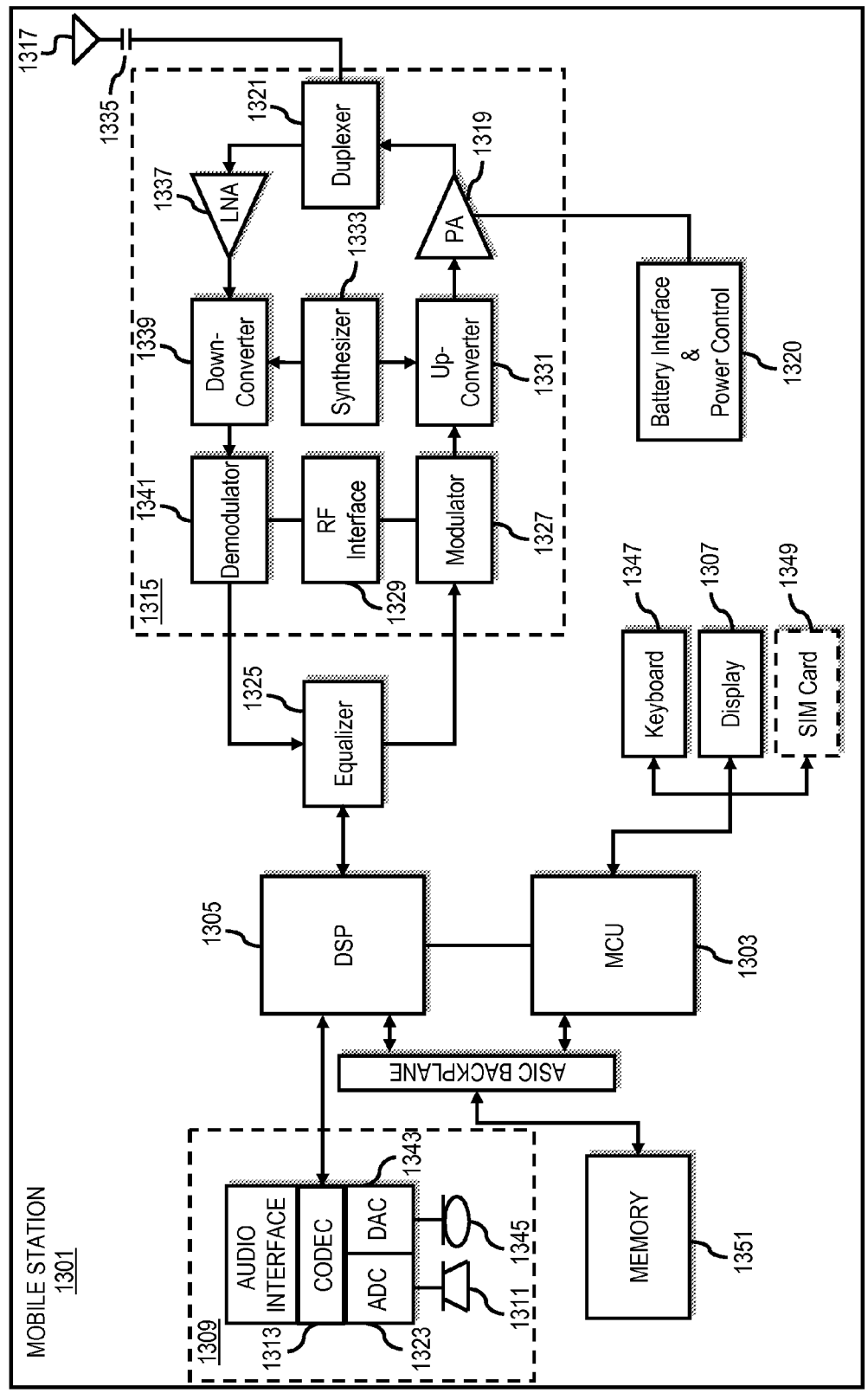
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of encoding decision diagrams. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of reducing communications traffic on networks by encoding decision diagrams. The display unit 1307 includes display circuitry configured to display at least a portion of a user interface of the mobile terminal (e.g., mobile telephone). Additionally, the display unit 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to encode decision diagrams. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    constructing a reduced ordered binary decision diagram from a resource description framework graph;
    computing a hash identifier corresponding to the decision diagram; and
    causing, at least in part, a storing of the hash identifier with the decision diagram.

2. A method of claim 1, wherein the constructing step comprises:
    serializing the resource description framework graph into variables of a predetermined format;
    determining a bit size of the variables by calculating sizes of the variables or using a fixed size; and
    constructing a representation of the reduced ordered binary decision diagram from the variables.

3. A method of claim 2, wherein the computing step comprises:
selecting a hash function for obtaining unique hash identifiers; and
feeding the representation into the hash function thereby computing the hash identifier.

4. A method of claim 2, further comprising:
shortening the hash identifier by truncating a result of the hash function while obtaining unique hash identifiers.

5. A method of claim 1, further comprising:
recomputing the hash identifier, when the resource description framework graph changes.

6. A method of claim 1, further comprising:
encrypting the hash identifier with a key to generate a keyed hash identifier of the decision diagram; and
causing, at least in part, a transmitting of the keyed hash identifier and an identifier of the key in response to a query.

7. A method of claim 1, further comprising:
receiving a keyed hash identifier of the decision diagram and an identifier of a key used to encrypt the hash identifier into the keyed hash identifier of the decision diagram;
searching for the key with the received key identifier; and
decrypting the keyed hash identifier with the key to generate the hash identifier.

8. An apparatus comprising:
at least one processor; and
at least one memory including computer program code for one or more programs,
wherein the at least one memory and the computer program code configured to, with the at least one processor, cause the apparatus to perform at least the following:
construct a reduced ordered binary decision diagram from a resource description framework graph;
compute a hash identifier corresponding to the decision diagram; and
cause, at least in part, a storing of the hash identifier with the decision diagram.

9. An apparatus of claim 8, wherein to construct the decision diagram, the apparatus is further caused to:
serialize the resource description framework graph into variables of a predetermined format;
determine a bit size of the variables by calculating sizes of the variables or using a fixed size; and
construct a representation of the reduced ordered binary decision diagram from the variables.

10. An apparatus of claim 9, wherein to compute the hash identifier, the apparatus is further caused to:
select a hash function for obtaining unique hash identifiers; and
feed the representation into the hash function thereby computing the hash identifier.

11. An apparatus of claim 9, wherein the apparatus is further caused to:
shorten the hash identifier by truncating a result of the hash function while obtaining unique hash identifiers.

12. An apparatus of claim 8, wherein the apparatus is further caused to:
recompute the hash identifier, when the resource description framework graph changes.

13. An apparatus of claim 8, wherein the apparatus is further caused to:
encrypt the hash identifier with a key to generate a keyed hash identifier of the decision diagram; and
cause, at least in part, a transmitting of the keyed hash identifier and an identifier of the key in response to a query.

14. An apparatus of claim 8, wherein the apparatus is further caused to:
receive a keyed hash identifier of the decision diagram and an identifier of a key used to encrypt the hash identifier into the keyed hash identifier of the decision diagram;
search for the key with the received key identifier; and
decrypt the keyed hash identifier with the key to generate the hash identifier.

15. A non-transitory computer-readable storage medium carrying one or more sequences of one or more instructions which, when executed by one or more processors, cause an apparatus to perform at least the following steps:
construct a reduced ordered binary decision diagram from a resource description framework graph;
compute a hash identifier corresponding to the decision diagram; and
cause, at least in part, a storing of the hash identifier with the decision diagram.

16. A non-transitory computer-readable storage medium of claim 15, wherein to construct the decision diagram, the apparatus is caused to further perform:
serialize the resource description framework graph into variables of a predetermined format;
determine a bit size of the variables by calculating sizes of the variables or using a fixed size; and
construct a representation of the reduced ordered binary decision diagram from the variables.

17. A non-transitory computer-readable storage medium of claim 16, wherein to compute the hash identifier, the apparatus is caused to further perform:
select a hash function for obtaining unique hash identifiers; and
feed the representation into the hash function thereby computing the hash identifier.

18. A non-transitory computer-readable storage medium of claim 16, wherein the apparatus is caused to further perform:
shorten the hash identifier by truncating a result of the hash function while obtaining unique hash identifiers.

19. A non-transitory computer-readable storage medium of claim 15, wherein the apparatus is caused to further perform:
reconstruct the hash identifier, when the resource description framework graph changes.

20. A non-transitory computer-readable storage medium of claim 15, wherein the apparatus is caused to further perform:
encrypt the hash identifier with a key to generate a keyed hash identifier of the decision diagram; and
cause, at least in part, a transmitting of the keyed hash identifier and an identifier of the key in response to a query.

* * * * *